(12) United States Patent
Saruwatari et al.

(10) Patent No.: US 7,273,675 B2
(45) Date of Patent: *Sep. 25, 2007

(54) AQUEUS ELECTROLYTIC SOLUTION PRIMARY BATTERY

(75) Inventors: Hidesato Saruwatari, Kawasaki (JP); Haruchika Ishii, Kawasaki (JP); Takahiro Hirai, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 431 days.

This patent is subject to a terminal disclaimer.

(21) Appl. No.: 10/742,931

(22) Filed: Dec. 23, 2003

(65) Prior Publication Data

US 2004/0185331 A1 Sep. 23, 2004

(30) Foreign Application Priority Data

Dec. 27, 2002 (JP) .............................. 2002-381375

(51) Int. Cl.
  *H01M 2/18* (2006.01)
  *H01M 2/12* (2006.01)
(52) U.S. Cl. .................. 429/129; 429/86; 429/174
(58) Field of Classification Search ............. 429/86, 429/129, 130, 174, 207
See application file for complete search history.

(56) References Cited

U.S. PATENT DOCUMENTS

| | | | |
|---|---|---|---|
| 2,838,591 A | 6/1958 | Stokes | 429/184 |
| 3,741,813 A * | 6/1973 | Bergum et al. | 429/53 |
| 3,970,479 A * | 7/1976 | King | 429/82 |
| 4,469,764 A * | 9/1984 | Schumm, Jr. | 429/86 |
| 4,861,688 A * | 8/1989 | Miura et al. | 429/206 |
| 5,080,985 A * | 1/1992 | Wiacek et al. | 429/172 |
| 5,472,807 A * | 12/1995 | Licht et al. | 429/207 X |
| 6,589,692 B2 | 7/2003 | Takami | 429/199 |
| 6,887,614 B2 * | 5/2005 | Duprey et al. | 429/56 |

FOREIGN PATENT DOCUMENTS

| | | |
|---|---|---|
| JP | 3-284335 | 12/1991 |
| JP | 5-159765 | 6/1993 |
| JP | 8-77996 | 3/1996 |
| JP | 8-153499 | 6/1996 |
| JP | 2001-319662 | 11/2001 |

* cited by examiner

*Primary Examiner*—Stephen J. Kalafut
(74) *Attorney, Agent, or Firm*—Oblon, Spivak, McCLelland, Maier & Neustadt, P.C.

(57) ABSTRACT

The invention provides a battery including a power generating element container, a positive electrode mixture, and a hydrogen gas permeable sheet provided in an opening of the power generating element container, the hydrogen gas permeable sheet having a water repellence of 2 kPa or more and a He gas permeability at 30° C. in a range of $2 \times 10^{-6}$ to $10000 \times 10^{-6}$ ($cm^3$ (STP) $cm/sec \cdot cm^2 \cdot cmHg$), wherein a distance between the positive electrode mixture and the hydrogen gas permeable sheet gradually decreases toward a side wall of the power generating element container.

19 Claims, 3 Drawing Sheets

AQUEUS ELECTROLYTIC SOLUTION PRIMARY BATTERY

CROSS-REFERENCE TO RELATED APPLICATIONS

This application is based upon and claims the benefit of priority from the prior Japanese Patent Application No. 2002-381375, filed Dec. 27, 2002, the entire contents of which are incorporated herein by reference.

BACKGROUND OF THE INVENTION

1. Field of the Invention

The present invention relates to a primary battery such as an aluminum negative electrode battery using at least one of aluminum and aluminum alloy as a negative electrode active material.

2. Description of the Related Art

At present, manganese batteries and alkaline batteries are widely used in portable appliances. Manganese batteries and alkaline batteries both comprise negative electrodes made of zinc and positive electrodes containing manganese dioxide, and have an electromotive force of 1.5 V. Owing to recent developments in portable appliances, primary and secondary batteries of high voltage, large capacity, and light weight are being demanded.

For example, a primary battery using aluminum as its negative electrode is expected to have high voltage, large capacity, and light weight compared with a primary battery using zinc as its negative electrode, and has been researched for a long time. For instance, the specification of U.S. Pat. No. 2,838,591 discloses a battery comprising a positive electrode including manganese dioxide, a negative electrode made of aluminum, and an electrolytic solution made of weak acidic aqueous solution of aluminum chloride. This battery, however, has a problem in reactivity between the aluminum used in the negative electrode and the electrolytic solution, and is hence large in self-discharge, large in generation of hydrogen gas, and small in capacity.

More recently, a highly practicable aluminum negative electrode battery has been proposed as in Jpn. Pat. Appln. KOKAI Publication No. 2001-319662. In this aluminum negative electrode battery, however, even if there is no factor for inducing hydrogen gas generation such as an external short-circuit or abnormal high temperature, the negative electrode and electrolysis solution react with each other to generate a huge quantity of hydrogen gas, and a high discharge capacity cannot be obtained. Aside from the tremendous gas generation during discharge, there is a possibility of electrolyte leakage induced by the osmotic phenomenon caused by dissolution of discharge product of the negative electrode into the electrolysis solution, and it is far from commercial production.

On the other hand, according to Jpn. Pat. Appln. KOKAI Publication No. 8-77996, a water repellent polymer sheet having gas permeable and liquid impermeable properties is provided between the gasket and the negative electrode bottom plate, and the gas in the battery is forced outside the battery, and leakage or scattering of electrolytic solution to the outside of the battery is prevented.

However, the battery disclosed in Jpn. Pat. Appln. KOKAI Publication No. 8-77996 is large in electrolyte leakage, and high discharge capacity cannot be achieved.

BRIEF SUMMARY OF THE INVENTION

It is hence an object of the invention to provide a battery improved in discharge capacity and lowered in the possibility of electrolyte leakage.

According to a first aspect of the invention, there is provided a battery comprising:

a power generating element container;

a positive electrode mixture opposing an inner surface of the power generating element container;

a negative electrode gel provided in the power generating element container and containing a negative electrode active material and an aqueous electrolysis solution;

a separator provided between the positive electrode mixture and the negative electrode gel; and a hydrogen gas permeable sheet provided in an opening of the power generating element container, the hydrogen gas permeable sheet having a water repellence of 2 kPa or more and a He gas permeability at 30° C. in a range of $2\times10^{-6}$ to $10000\times10^{-6}$ ($cm^3$ (STP) cm/sec·$cm^2$·cmHg), wherein a distance between the positive electrode mixture and the hydrogen gas permeable sheet gradually decreases toward a side wall of the power generating element container.

According to a second aspect of the invention, there is provided a battery comprising:

a negative electrode container;

a positive electrode mixture provided in the negative electrode container, and holding an aqueous electrolysis solution;

a separator provided between an inner surface of the negative electrode container and the positive electrode mixture; and a hydrogen gas permeable sheet provided in an opening of the negative electrode container, the hydrogen gas permeable sheet having a water repellence of 2 kPa or more and a He gas permeability at 30° C. in a range of $2\times10^{-6}$ to $10000\times10^{-6}$ ($cm^3$ (STP) cm/sec·$cm^2$·cmHg), wherein a distance between the positive electrode mixture and the hydrogen gas permeable sheet gradually decreases away from a side wall of the negative electrode container.

According to a third aspect of the invention, there is provided a battery comprising:

a battery case;

a power generating element provided in the battery case and including an aqueous electrolysis solution; and a hydrogen gas permeable sheet provided in an opening of the battery case, the hydrogen gas permeable sheet having a water repellence of 2 kPa or more and a He gas permeability at 30° C. in a range of $2\times10^{-6}$ to $10000\times10^{-6}$ ($cm^3$ (STP) cm/sec·$cm^2$·cmHg), wherein the hydrogen gas permeable sheet has a surface that faces the power generating element and has recesses satisfying the following formula (1):

$$0.01X \leq D \leq 0.95X \quad (1)$$

where D is a depth of each recess (μm) and X is a thickness of the hydrogen gas permeable sheet (μm).

DETAILED DESCRIPTION OF THE INVENTION

A first battery of the invention comprises:

a power generating element container, a tubular positive electrode mixture provided inside of the power generating element container, a bag-like separator provided in a hollow space of the positive electrode mixture, a negative electrode gel accommodated in the separator and containing a negative electrode active material and an aqueous electrolytic solution, and a hydrogen gas permeable sheet provided in the opening of the power generating element container, the hydrogen gas permeable sheet having a water repellence of 2 kPa or more and a He gas permeability at 30° C. in a range of $2 \times 10^{-6}$ to $10000 \times 10^{-6}$ ($cm^3$ (STP) cm/sec·$cm^2$·cmHg), in which the inner surface of the hydrogen gas permeable sheet is inclined so that the distance between the inner surface and the positive electrode mixture gradually decreases toward a side wall of the power generating element container.

Herein, the power generating element container is either a container serving also as a positive electrode current collector or a positive electrode, or a container serving neither as a positive electrode nor as a negative electrode such as resin container.

In the first battery of the invention, it is desired that the hydrogen gas permeable sheet is fixed by a liquid gasket of which the junction limit pressure is 80 kgf/$cm^2$ or less at the opening of the power generating element container.

Also in the first battery of the invention, it is desired that a water repellent layer of contact angle with water of 70 degrees or more is formed on the inner surface of the power generating element container and between the hydrogen gas permeable sheet and the positive electrode mixture.

Figure 1:
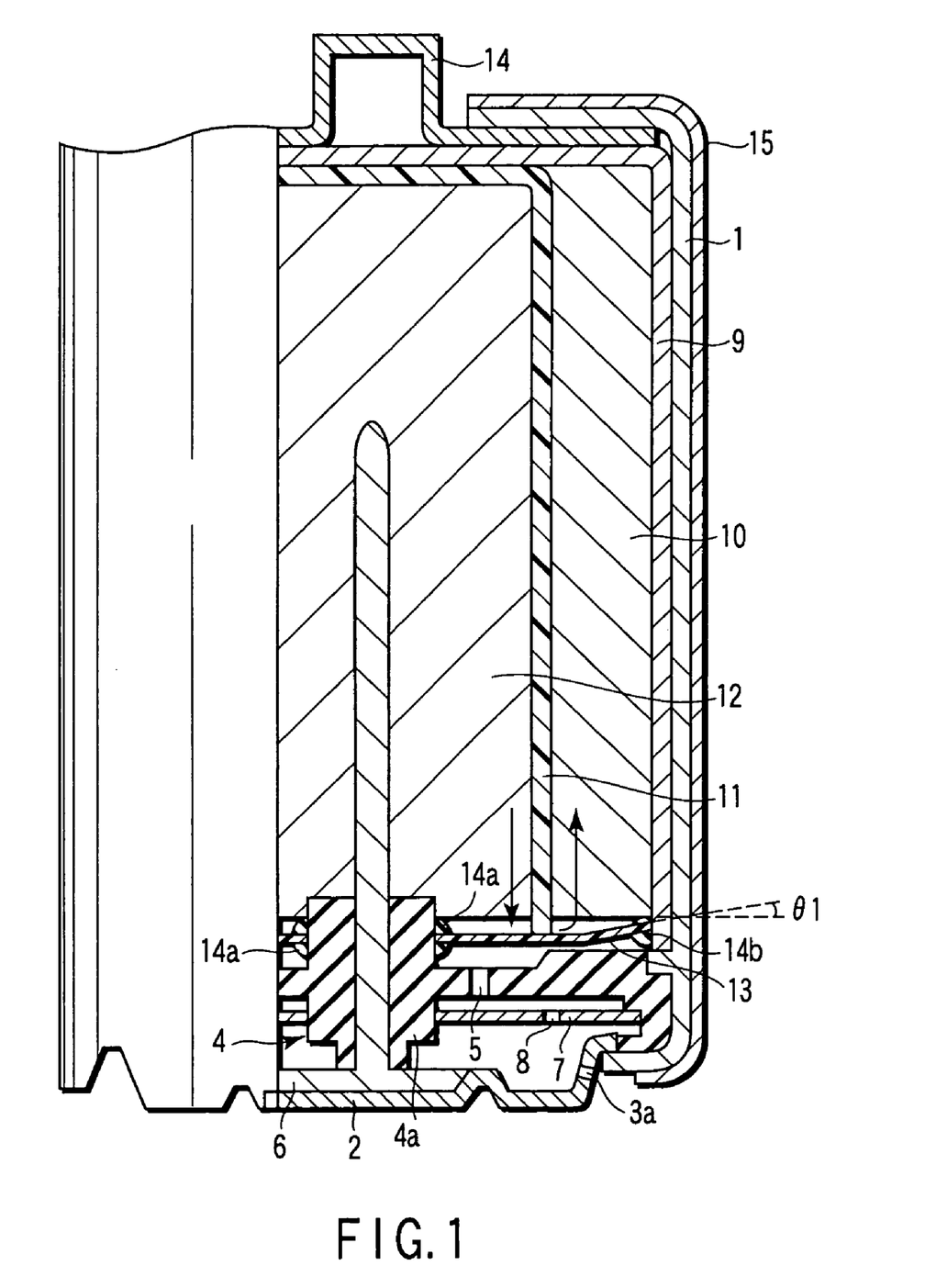
FIG. 1 is a partial sectional view showing an aluminum negative electrode battery of alkaline dry battery structure as an example of a first battery of the invention.
Figure 2:
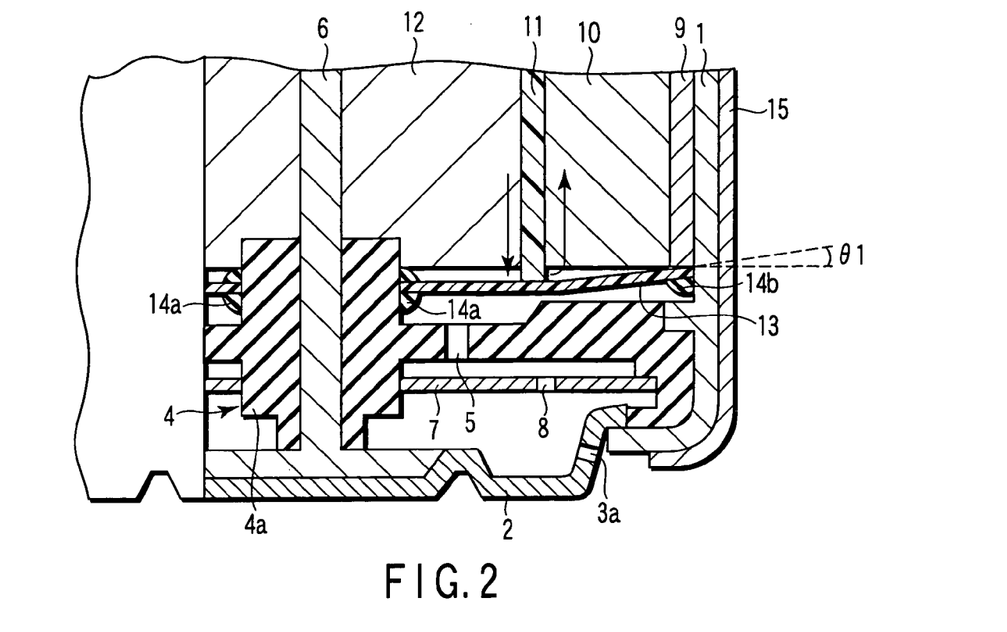
FIG. 2 is an enlarged sectional view of essential parts of the aluminum negative electrode battery in FIG. 1.

An example of the first battery is explained by referring to FIG. 1 and FIG. 2.

As shown in FIG. 1 and FIG. 2, a cylindrical package 1 is formed of a material containing resin that forms the inner surface. The opening lower end of the package 1 is folded inward, and this folded portion is adhered to a peripheral edge of a bottom plate 2 serving also as a negative electrode terminal by means of an adhesive insulating material (for example, tar or pitch). A gas vent hole 3a is opened in the bottom plate 2.

A negative electrode gasket 4 is an annular member having a negative electrode current collector mounting hole in its center. The surrounding of the negative electrode current collector mounting hole is a thick wall 4a. The gas vent hole 5 is opened in a thinner position than the thick wall 4a. The negative electrode gasket 4 having such structure is inserted into the package 1 with the peripheral edge folded downward.

A negative electrode current collector 6 is inserted into the negative electrode current collector mounting hole in the thick wall 4a of the negative electrode gasket 4, and its lower end is welded to the inside of the bottom plate 2. A metal washer 7 is inserted between the folded portion of the negative electrode gasket 4 and the thick wall 4a. By the repulsive elastic force applied to the negative electrode gasket 4 by this metal washer 7, the contact adhesion of the package 1, negative electrode gasket 4 and negative electrode current collector 6 is enhanced, and the liquid tightness is assured. The metal washer 7 also has a gas vent hole 8.

A positive electrode can (power generating element container) 9 of cylindrical form with bottom functioning as a positive electrode current collector is inserted into the package 1 with the opening facing downward. This positive electrode can 9 may be formed of, for example, a positive electrode current collector component material described below. A cylindrical positive electrode mixture 10 is contact with the inner surface of the side wall of the positive electrode can 9. A separator 11 of cylindrical form with bottom is provided in a hollow space of the positive electrode mixture 10. A negative electrode gel 12 fills up the separator 11. An electrolytic solution is held in the negative electrode gel 12, separator 11 and positive electrode mixture 10. The negative electrode current collector 6 is inserted into the negative electrode gel 12.

An annular hydrogen gas permeable sheet 13 with an inclined peripheral edge is inserted between the inner circumference of the positive electrode can 9 and the surrounding of the thick wall 4a of the negative electrode gasket 4. The outer circumference of the hydrogen gas permeable sheet 13 is joined to the inner circumference of the positive electrode can 9 by means of a liquid gasket 14b. On the other hand, the inner circumference of the hydrogen gas permeable sheet 13 is joined to the periphery of the thick wall 4a of the negative electrode gasket 5 by means of a liquid gasket 14a. The peripheral edge of the hydrogen gas permeable sheet 13 is inclined so that the distance between the upper surface of the hydrogen gas permeable sheet 13 and the lower surface of the positive electrode mixture 10 may decrease from the negative electrode gel 12 side toward the side wall of the positive electrode can 9. Namely, the distance between the positive electrode mixture 10 and the outer circumference of the hydrogen gas permeable sheet 13 is shorter than the distance between the mixture 10 and any other part of the sheet 13. The inclination angle $\theta_1$ in which the upper surface of the hydrogen gas permeable sheet 13 toward the lower surface of the positive electrode mixture 10 is preferred to be in a range of 3 degrees to 65 degrees.

A cap-shaped sealing plate (positive electrode terminal plate) 14 serving also as the positive electrode terminal is arranged on the top of the positive electrode can 9. The opening upper end of the package 1 is folded inward, and inside of the folded portion is adhered to the peripheral edge of the sealing plate 14 by means of an adhesive insulating material (for example, tar or pitch). An outer tube 15 made of, for example, metal foil covers the package 1.

In the aluminum negative electrode battery of such structure, when discharge reaction progresses, discharge product of the negative electrode (for example, aluminum hydroxide) starts remaining between the separator 11 and negative electrode gel 12. Herein, if the dissolution of the discharge product of the negative electrode is low and the diffusion speed of the discharge product is low due to some reason, water molecules are collected at the negative electrode side of the separator by osmotic phenomenon. Since the volume if the gap between the separator 11 and negative electrode gel 12 is small, the collected electrolytic solution cannot be held therein. If a gas permeable water repellent polymer film is arranged between the gasket and bottom plate, for example, as disclosed in Jpn. Pat. Appln. KOKAI Publication No. 8-77996, electrolyte leakage cannot be prevented sufficiently, the electrolytic solution collected between the water repellent polymer film and gasket cannot return to the in the power generating element is insufficient, and high discharge capacity cannot be achieved, as clarified by the present inventor.

As also clarified by the inventor, since hydrogen gas is generated during discharge reaction, if the opening of the positive electrode can 9 is closed by using a material of very low hydrogen permeability such as asphalt, the equilibrium of discharge reaction is broken, and the discharge reaction of the battery is lowered.

The inventor repeated intensive studies, and discovered that the electrolytic solution overflowing from the negative electrode and separator can be returned to the positive electrode as indicated by an arrow in FIG. 1 without leaking outside of the battery, by arranging the hydrogen gas permeable sheet 13 between the inner surface of the opening of the positive electrode can (power generating element container) 9 and the negative electrode gasket 4 so as to enclose the power generating elements that includes the positive electrode mixture 10, separator 11 and negative electrode gel 12 in the positive electrode can 9, and inclining the peripheral edge of the hydrogen gas permeable sheet 13 so that the distance between the sheet 13 and the positive electrode mixture 10 may decrease from the center of the positive electrode can 9 toward the side wall, or along the radial direction. Hydrogen gas generated by discharge reaction passes through the hydrogen gas permeable sheet 13, and sequentially passes through the gas vent hole 5 of the negative electrode gasket 4 and the gas vent hole 8 of the metal washer 7, and further passes through very narrow gap existing between the bottom plate 2 and package 1 and the gas vent hole 3a of the bottom plate 2, and is released to outside, and therefore evaporation of electrolytic solution is suppressed to a minimum limit, and hydrogen gas can be forced out of the battery. Hence, the invention can enhance the discharge capacity and suppress electrolyte leakage at the same time.

The inclination angle $\theta_1$ is preferred to be in a range of 3 degrees to 65 degrees. The reason is as follows. If the inclination angle $\theta_1$ is smaller than 3 degrees, the electrolytic solution overflowing from the power generating elements hardly returns to the positive electrode, and the discharge capacity may drop or the leak rate may increased. On the other hand, if the inclination angle $\theta_1$ is more than 65 degrees, the active material filling amount is insufficient, and large capacity may not be achieved. A more preferred range of inclination angle $\theta_1$ is 15 degrees to 45 degrees. When the inclination angle $\theta_1$ is in a range of 15 degrees to 45 degrees, a battery of high discharge capacity and low leak rate is achieved. In FIG. 1 and FIG. 2, only the peripheral edge of the hydrogen gas permeable sheet 13 is inclined, but the entire surface may be inclined. As shown in FIG. 1 and FIG. 2, both surfaces of the hydrogen gas permeable sheet 13 may be inclined, but only the surface opposite to the power generating element may be inclined.

In FIG. 1 and FIG. 2, the hydrogen gas permeable sheet 13 contacts with part of the power generating elements (in this case, the end face of the separator 11), but the hydrogen gas permeable sheet 13 may be installed apart from the power generating elements, and an air space may be formed between the power generating elements and the hydrogen gas permeable sheet. As a result, the electrolytic solution can be circulated more smoothly from the interface of the negative electrode gel 12 and the separator 11 toward the positive electrode direction, and the occurrence rate of electrolyte leakage can be further lowered. At the same time, the generated hydrogen gas may be temporarily held in the air space, and sudden elevation of internal pressure can be avoided.

By using the liquid gaskets 14a, 14b, the hydrogen gas permeable sheet 13 can be provided between the opening inside of the positive electrode can 9 and the negative electrode gasket 4 without gaps, and hence the electrolyte leakage preventive effect can be further enhanced. In the aluminum negative electrode battery of the structure shown in FIG. 1 and FIG. 2, in the event of rupture of battery or the like due to gas generation caused by some trouble, the liquid gaskets 14a, 14b are broken to release the gas to outside of the battery, so that the state of safety can be maintained.

The liquid gasket is preferred to be formed of a material containing at least one resin selected from olefin resin, silicone resin, acrylic resin, epoxy resin and fluoro plastic resin. A non-drying liquid gasket is particularly preferred from the viewpoint of restoration after gas-releasing operation.

The junction limit pressure of the liquid gasket is measured by the pressure resisting test in JIS K 6820. If the battery inner pressure exceeds the junction limit pressure, the liquid gasket may burst. The junction limit pressure is preferred to be 80 kgf/cm$^2$ or less. If the junction limit pressure exceeds 80 kgf/cm$^2$, the gas-releasing function is lost, and rupture cannot be prevented in the event of abnormal gas generation. A more preferred range of junction limit pressure is 30 kgf/cm$^2$ or less, and most preferred range is 10 kgf/cm$^2$ or less.

In FIG. 1 and FIG. 2, the hydrogen gas permeable sheet 13 is inclined, but instead of inclining the hydrogen gas permeable sheet 13, the height of the positive electrode mixture 10 may be varied, and the lower surface of the positive electrode mixture 10 may be an inclined surface, thereby varying the distance between the positive electrode mixture 10 and hydrogen gas permeable sheet 13. However, by varying the height of the positive electrode mixture 10, the discharge reaction may occur locally, and hence it is preferred to incline the hydrogen gas permeable sheet 13.

The positive electrode, negative electrode, separator, electrolytic solution, and hydrogen gas permeable sheet used in the first battery of the invention are specifically described below.

1) Positive Electrode

The positive electrode comprises a current collector, and a positive electrode mixture formed on the surface of the current collector and containing positive electrode active material and conductive agent. A binder is added as required to the positive electrode mixture.

The positive electrode active material includes metal oxide, metal sulfide, and conductive polymer.

Examples of the metal oxide include manganese dioxide ($MnO_2$), zinc dioxide ($PbO_2$), nickel hydroxide {NiOOH or Ni(OH)$_2$}, silver oxide ($Ag_2O$), and iron oxide such as FeO, $Fe_2O_3$, $FeO_x$ (where x is x>1.5), or $MxFeO_4$ (where M is at least one selected from Li, K, Sr and Ba, and x is x$\geq$1). Preferred conductive polymers are polyaniline, polypyrrole, disulfide compound, sulfur, and other organic sulfur compounds. In particular, manganese dioxide is preferred.

Conductive agents include graphite, acetylene black, carbon black, and others.

By containing a conductive agent in a positive electrode mixture, the electron conductivity between the positive electrode mixture and the current collector can be enhanced.

The content of the conductive agent in the positive electrode mixture is preferred to be in a range of 1 to 20 wt. %. That is, if the content of the conductive agent in the positive electrode mixture is less than 1 wt. %, the electron conductivity in the positive electrode mixture cannot be enhanced sufficiently. On the other hand, if the content of the conductive agent in the positive electrode mixture is more than 20 wt. %, the content of the positive electrode active material is lowered, and the positive electrode reaction may not be sufficient.

The positive electrode mixture is prepared by mixing positive electrode active material powder and conductive agent, and molding it by pressure to form pellets. By adding a binder to the positive electrode mixture as required, the positive electrode active material may be fixed on the surface of the current collector.

The binder to be contained in the positive electrode mixture is, for example, polytetrafluoroethylene.

The positive electrode current collector can support the positive electrode mixture, and also enhance the electron conductivity between the positive electrode mixture and positive electrode terminal.

The positive electrode current collector may be either porous or nonporous.

The material for forming the positive electrode current collector is, for example, at least one material selected from the group consisting of tungsten (W), molybdenum (Mo), lead (Pb) and titanium nitride (TiN), or conductive material such as carbonaceous material. In the positive electrode current collector, tungsten (W), molybdenum (Mo), and lead (Pb) may be used either alone or as alloy of two or more materials selected from tungsten, molybdenum and lead. The positive electrode current collector containing titanium nitride (TiN) is either the positive electrode current collector composed of titanium nitride or one of nickel plate or other metal plate of which surface is coated (plated) with titanium nitride. In particular, at least one metal selected from the group of tungsten (W) and molybdenum (Mo), or carbonaceous material is preferred.

When the positive electrode current collector contains a conductive material of one or more types selected from tungsten (W), molybdenum (Mo), lead (Pb), and titanium nitride (TiN), the content of the conductive material in the positive electrode current collector is preferred to be 99 wt. % or more. A more preferable range is 99.9 wt. % or more.

The positive electrode current collector containing carbonaceous material is fabricated by, for example, mixing carbonaceous material powder and binder, and molding it by pressure.

The carbonaceous material powder includes graphite powder and carbon fiber.

The content of the carbonaceous material in the positive electrode current collector is preferred to be 80 wt. % or more. A more preferable range is 90% or more.

The positive electrode may be used by mixing with the electrolytic solution described later.

2) Negative Electrode

The negative electrode contains aluminum, aluminum alloy, both aluminum and aluminum alloy, zinc, lead, silver, or magnesium as negative electrode active material. Among them, aluminum and aluminum alloy are preferred from the viewpoint of capacity per weight. Besides, since the gas generation amount is large during discharge and storage, the discharge capacity can be improved significantly by using the hydrogen gas permeable sheet of the invention.

The purity of the negative electrode metal is 99 wt. % or more, that is, the impurity should be 1 wt. % or less. In particular, in the case of aluminum, the purity should be 99.5 wt. % or more, that is, aluminum with impurity of 0.5 wt. % or less should be used. If the impurity is contained by more than 0.5 wt. %, it is likely to be corroded by the electrolytic solution, and violent self-discharge or gas generation may take place. A more preferred range of purity is 99.9 wt. % or more.

An aluminum alloy is an alloy containing Al and at least one metal selected from the group consisting of Mn, Cr, Sn, Ca, Mg, Pb, Si, In and Zn. In particular, an alloy containing Al and at least one metal selected from Mg, Mn, Zn, Pb and Cr is preferred. A specific composition of aluminum alloy is, for example, 94.5 wt. % Al-2 wt. % Mg-3.5 wt. % Cr, 95 wt. % Al-5 wt. % Mg, 99.5 wt. % Al-0.3 wt. % Mn-0.2 wt. % Zn, 95 wt. % Al-5 wt. % Pb, and 94.95 wt. % Al-5 wt. % Mn-0.05 wt. % In.

The negative electrode may be used by mixing preliminarily with the electrolytic solution described below. That is, a negative electrode gel containing negative electrode active material, electrolytic solution, and polymer for holding this electrolytic solution may be used.

The surface of the negative electrode may be coated with an additive explained in the following section 4) of electrolytic solution.

3) Separator

The separator is composed of, for example, insulating material. The electrolytic solution is held in the separator, and the ionized electrolyte must be movable in the electrolytic solution, and hence the separator is preferably made of porous material.

The separator is formed of, for example, kraft paper, synthetic fiber sheet, natural fiber sheet, nonwoven fabric, glass fiber sheet, or polyolefin porous film.

The thickness of the separator should be in a range of 10 to 200 μm. If the thickness of the separator is smaller than 10 μm, short-circuit may occur between the positive electrode and negative electrode. On the other hand, if the thickness of the separator is larger than 200 μm, the moving distance of the ionized electrolyte becomes longer and the ion conduction efficiency may be lowered.

If the positive electrode and negative electrode are provided so as not to contact with each other, and the battery structure is designed to hold the electrolytic solution between the positive electrode and negative electrode, the separator is not always required. Alternately, by adding a thickener to the electrolytic solution to be subjected to gel, a solid electrolyte may be used. In this case, the thickener phase functions as the separator, and the electrolytic solution phase is held in the thickener phase. The separator may be used at the same time.

4) Electrolyte Solution

The electrolytic solution contains an electrolyte and a solvent for dissolving the electrolyte. It is preferred to add an additive to the electrolytic solution for suppressing corrosive reaction between the electrolytic solution and negative electrode. The electrolytic solution may also contain other additives for other purposes than suppression of corrosive reaction between the electrolytic solution and negative electrode.

(4-1) Electrolyte

The electrolyte is a compound supplying at least one ion (called first ion hereinafter) of sulfate ion ($SO_4^{2-}$) and nitrate ion ($NO_3^-$) in a solvent. By supplying such highly reactive ion such as sulfate ion ($SO_4^{2-}$) and nitrate ion ($NO_3^-$) in the electrolytic solution, the obtained battery has a high output.

The nitrate ion can be supplied by nitric acid, aluminum nitrate, sodium nitrate, potassium nitrate, ammonium nitrate, lithium nitrate, etc.

The amount of electrolyte in the electrolytic solution is preferred to be the concentration of the first ion in a range of 0.2 to 16 M/L. If the concentration of the first ion is less than 0.2 M/L, the ion conductivity may be lowered. When containing an additive to the electrolytic solution, it may be hard to form the film containing the additive sufficiently on the negative electrode surface, and corrosive reaction of the negative electrode may not be suppressed sufficiently. On the other hand, if the concentration of the first ion exceeds 16 M/L, the film growth on the negative electrode surface is significant, and the interface resistance of the negative electrode is increased, and high voltage may not be achieved. A more preferred range is 0.5 to 10 M/L.

(4-2) Additive

Examples of the additive include organic compound containing nitrogen, organic acid, organic acid salt, organic acid ester, organic acid anhydride, organic acid ion, and their derivatives. One or two or more types of additives may be used. The additive is preferred to contain as an essential component organic compound containing nitrogen.

The additive is present on the negative electrode surface by the functional group of the additive, and is considered to suppress the corrosive reaction of electrolyte such as $H_2SO_4$ and Al of the negative electrode. Some of the additives are adsorbed on the negative electrode. Others are adhered to form a film. Alternately, a specific layer is formed. Some exist near the negative electrode. Each additive exhibits its performance in each state.

An example of using manganese dioxide as positive electrode active material in the positive electrode reaction and negative electrode reaction in an aluminum negative electrode battery is shown in the following formulas (1) and (2).

Positive electrode: $MnO_2 + H^+ + e^- \rightarrow MnOOH$  (1)

Negative Electrode: $Al + 3H_2O \rightarrow Al(OH)_3 + 3H^+ + 3e^-$  (2)

On the other hand, aside from the battery reaction, for example, when sulfuric acid aqueous solution is used as the electrolytic solution, the aluminum of the negative electrode is likely to be corroded by the sulfuric acid (self-discharge) as shown in formula (3). The first ion is high in reactivity, and is high in battery output, and is also high in the reactivity of the corrosive reaction shown in formula (3).

$2Al + 3H_2SO_4 \rightarrow Al_2(SO_4)_3 + 3H_2$  (3)

The additive component existing on the negative electrode surface is low in electron conductivity, and hence can impede electron exchange between the sulfuric acid contained in the electrolytic solution and the aluminum of the negative electrode, so that the corrosive reaction of the negative electrode can be suppressed.

By using the additive, the corrosive reaction of formula (3) can be lowered without greatly losing the discharge reaction of formulas (1) and (2).

Examples of the nitrogen-containing organic compound include nitrogen-containing heterocyclic organic compound, organic compound containing at least one functional group selected from a group consisting of amino group (—$NH_2$), imino group (=NH), azo group (—N=N—), and azide group (—$N_3$), salt of the organic compound, ester of the organic compound, ion of the organic compound, and their derivatives. One or more types of nitrogen-containing organic compound may be used.

Specific examples are pyridine, pyrazine, triazine, quinoline, acrylidine, acridone, aniline, dipyridyl, pyrrolidine, pyrazole, imidazole, triazole, diphenyl amine, azobenzene, quinaldine, kinin, aminoquinoline, amino imidazole benzoate, oxyindole, benzothiazole, benzotriazole, oxyquinoline, acetamide, 1,10-phenanthroline, 1,10-phenanthronium chloride, bathophenanthroline, imide succinate, aminobenzoic acid, imide maleate, and 2-mercapto-5-methyl benzimidazole.

Examples of the organic acid include an acid containing at least one functional group selected from a group consisting of a carboxylic acid group (COOH), a sulfonic acid group ($SO_3H$), a hydroxyl group (OH), and a nitro group ($NO_2$), salt of the organic acid, ester of the organic acid, ion of the organic acid, and their derivatives. One or more kinds of organic acid may be used.

Specific examples of the organic acid include methyl alcohol, ethyl alcohol, propyl alcohol, butyl alcohol, phenol, glycerin, glycolic acid, ethylene glycol, formic acid, acetic acid, propionic acid, oxalic acid, salicylic acid, sulfosalicylic acid, malic acid, tartaric acid, succinic acid, fumaric acid, phthalic acid, malonic acid, citric acid, maleic acid, lactic acid, butyric acid, pyruvic acid, benzoic acid, sulfobenzoic acid, nitromethane, sulfoaniline, nitrobenzene sulfonyl, polyvinyl alcohol, vinyl acetate, vinyl sulfonate, poly(styrene sulfonic acid), poly(vinyl acetate), methyl acetate, acetic anhydride, maleic anhydride, phthalic anhydride, diethyl malonate, sodium benzoate, sodium sulfobenzoate, sulfoaniline chloride, ethyl chloroacetate, methyl dichloroacetate, poly(vinyl potassium acetate), poly(styrene lithium sulfonate), polyacrylic acid, and lithium polyacrylate. The polymer may be a copolymer containing one kind of the organic acid.

The concentration of the additive in the electrolyte is preferred to be in a range of 0.0001 to 6 M/L. If the concentration of the additive is less than 0.0001 M/L, a satisfactory effect of the additive is not obtained on the negative electrode surface. If the concentration of the additive is more than 6 M/L, the ion conductivity of the electrolyte is lowered, and a high voltage may not be obtained. A more preferable range of the concentration is 0.0005 to 4 M/L.

By setting the concentration of the additive in the electrolyte in a range of 0.0001 to 6 M/L, the additive component existing on the electrode surface should be preferably about $1 \times 10^{-20}$ g/cm$^2$ to 1 g/cm$^2$. If the amount is less than $1 \times 10^{-20}$ g/cm$^2$, it may be hard to sufficiently suppress the corrosion of the negative electrode. If the amount is more than 1 g/cm$^2$, the ion conductivity may be lowered.

The amount of the additive forming the film may be measured by an electrochemical crystal resonator microbalance method. Further, the effects of the invention may be sufficiently observed if the amount can be confirmed by various spectrochemical methods such as infrared spectroscopy, nuclear magnetic resonance spectrum, and ultraviolet visible absorption spectrum.

(4-3) Solvent

As the solvent, for example, water, methyl ethyl carbonate, γ-butyrolactone may be used.

It is preferred to further contain halogen ions in the electrolyte. Halogen ions are contained, and thereby the ion conductivity of the electrolyte can be enhanced. As a result, the battery voltage can be improved.

A compound supplying halogen ions includes, for example, fluorides such as hydrofluoric acid, sodium fluoride, and ammonium fluoride, chlorides such as hydrochloric acid, aluminum chloride, lithium chloride, calcium chloride, and chromium chloride, bromides such as ammonium bromide, zinc bromide, and potassium bromide, and iodides such as ammonium iodide and sodium iodide.

The concentration of halogen ions in the electrolyte is preferred to be in a range of 0.01 to 6 M/L. If the concentration of halogen ions is less than 0.01 M/L, effects of adding halogen ions may not be obtained sufficiently. If the concentration of halogen ions is more than 6 M/L, the progress of self-discharge tends to increase due to corrosion of the negative electrode. The preferred range is 0.05 to 4 M/L.

5) Hydrogen Gas Permeable Sheet

The He gas permeability coefficient at 30° C. of the hydrogen gas permeable sheet is measured by a method disclosed, for example, in JIS K 7126 (1987), which is Method of testing gas transmission rate through plastic film and sheet.

The He gas permeability coefficient at 30° C. of hydrogen gas permeable sheet is specified in the range mentioned above because if the He gas permeability coefficient is less than $2 \times 10^{-6}$ ($cm^3$ (STP) $cm/sec \cdot cm^2 \cdot cmHg$), the hydrogen gas permeability is lowered, and hydrogen gas is remained in the enclosed space containing the power generating elements, and the equilibrium of the discharge reaction is broken to lower the discharge capacity of the battery. If the He gas permeability coefficient exceeds $10000 \times 10^{-6}$ ($cm^3$ (STP) $cm/sec \cdot cm^2 \cdot cmHg$), the hydrogen gas permeability is higher, but other gas than hydrogen gas (such as steam) may also permeate. If steam permeates, the electrolytic solution may lose its water and the capacity may be lowered. A more preferred range is $2 \times 10^{-6}$ to $1000 \times 10^{-6}$ ($cm^3$ (STP) $cm/sec \cdot cm^2 \cdot cmHg$), and most preferred range is $2 \times 10^{-6}$ to $400 \times 10^{-6}$ ($cm^3$ (STP) $cm/sec \cdot cm^2 \cdot cmHg$).

The water repellency of the hydrogen gas permeable sheet is limited in the specified range because if the water repellency is less than 2 kPa, leakage of electrolytic solution due to creeping phenomenon cannot be suppressed, and the electrolytic solution may ooze out of the hydrogen gas permeable sheet, and the electrolytic solution cannot be returned to the positive electrode. A more preferred range is 5.3 kPa or more. A most preferred range is 9.3 kPa or more. At higher water repellency, the effect of prevention of electrolyte leakage is higher, but if the water repellency is too high, the He gas permeability coefficient at 30° C. becomes smaller than $2 \times 10^{-6}$ ($cm^3$ (STP) $cm/sec \cdot cm^2 \cdot cmHg$), which is not preferable.

The water repellency of the hydrogen gas permeable sheet is measured by using a metering pump as explained below. First, the hydrogen gas permeable sheet is installed in a pressure-resisting glass tube of 1 cm in diameter. Water is supplied from one end of the glass tube at a flow rate of 0.1 cc/min by using the metering pump. The pressure of the metering pump when starting supply is obtained as the water repellency (kPa) of the hydrogen gas permeable sheet. The metering pump is a pump used in gas chromatography or the like, which is a pump capable of pressurizing until the liquid is supplied at a constant flow rate.

The thickness of the hydrogen gas permeable sheet is preferred to be in a range of 0.1 mm to 3 mm. The reason is as follows. If the thickness is less than 0.1 mm, it may be difficult to prevent electrolyte leakage during discharge and storage. If the thickness exceeds 3 mm, the diffusion speed of hydrogen gas drops and high discharge capacity may not be achieved. A more preferred range of thickness is 0.15 mm to 1.2 mm.

The hydrogen gas permeable sheet of which He gas permeability coefficient at 30° C. is in a range of $2 \times 10^{-6}$ to $10000 \times 0.10^{-6}$ ($cm^3$ (STP) $cm/sec \cdot cm^2 \cdot cmHg$) is disclosed, for example, in Jpn. Pat. Appln. KOKAI Publication No. 3-284335, or the hydrogen gas permeable sheet may be fabricated by extrusion method, and the porosity of the material can be controlled by varying the air flow rate, and the gas permeable coefficient may be adjusted, or alumina may be dispersed in the material and is removed later, so that the gas permeable coefficient may be controlled. Alternately, fibers may be knit in one direction, thereby n pieces of polymer films may be prepared, and by overlaying them so that the fiber direction may differ by n/365 degrees each, so that the gas permeability coefficient may be adjusted.

The water repellency of the hydrogen gas permeable sheet may be controlled by varying, for example, the film surface area. As a method for changing the surface area, for example, melt-blow method may be employed. Alternately, the base material may be changed in molecular weight by ribbing bond, and polymers of different molecular weights are used as main materials, so that the surface area of the polymer film can be varied.

A second battery of the invention is described below. The second battery of the invention comprises:

a negative electrode container, a positive electrode mixture provided in the negative electrode container, and impregnated with an aqueous electrolytic solution, a separator provided between the inner surface of the negative electrode container and the positive electrode mixture, and a hydrogen gas permeable sheet provided in the opening of the negative electrode container, the hydrogen gas permeable sheet having a water repellence of 2 kPa or more and a He gas permeability at 30° C. in a range of $2 \times 10^{-6}$ to $10000 \times 10^{-6}$ ($cm^3$ (STP) $cm/sec \cdot cm^2 \cdot cmHg$), in which the inner surface of the hydrogen gas permeable sheet is inclined so that the distance between the inner surface and the positive electrode mixture may decrease from the side wall of the negative electrode container toward the central part in the radial direction.

In the second battery of the invention, it is desired that the hydrogen gas permeable sheet is fixed by a liquid gasket of which junction limit pressure is 80 kgf/$cm^2$ or less at the opening of the negative electrode container.

Also in the second battery of the invention, it is desired that a water repellent layer of contact angle with water of 70 degrees or more is provided on the inner surface of the negative electrode container and between the hydrogen gas permeable sheet and the positive electrode mixture.

Figure 3:
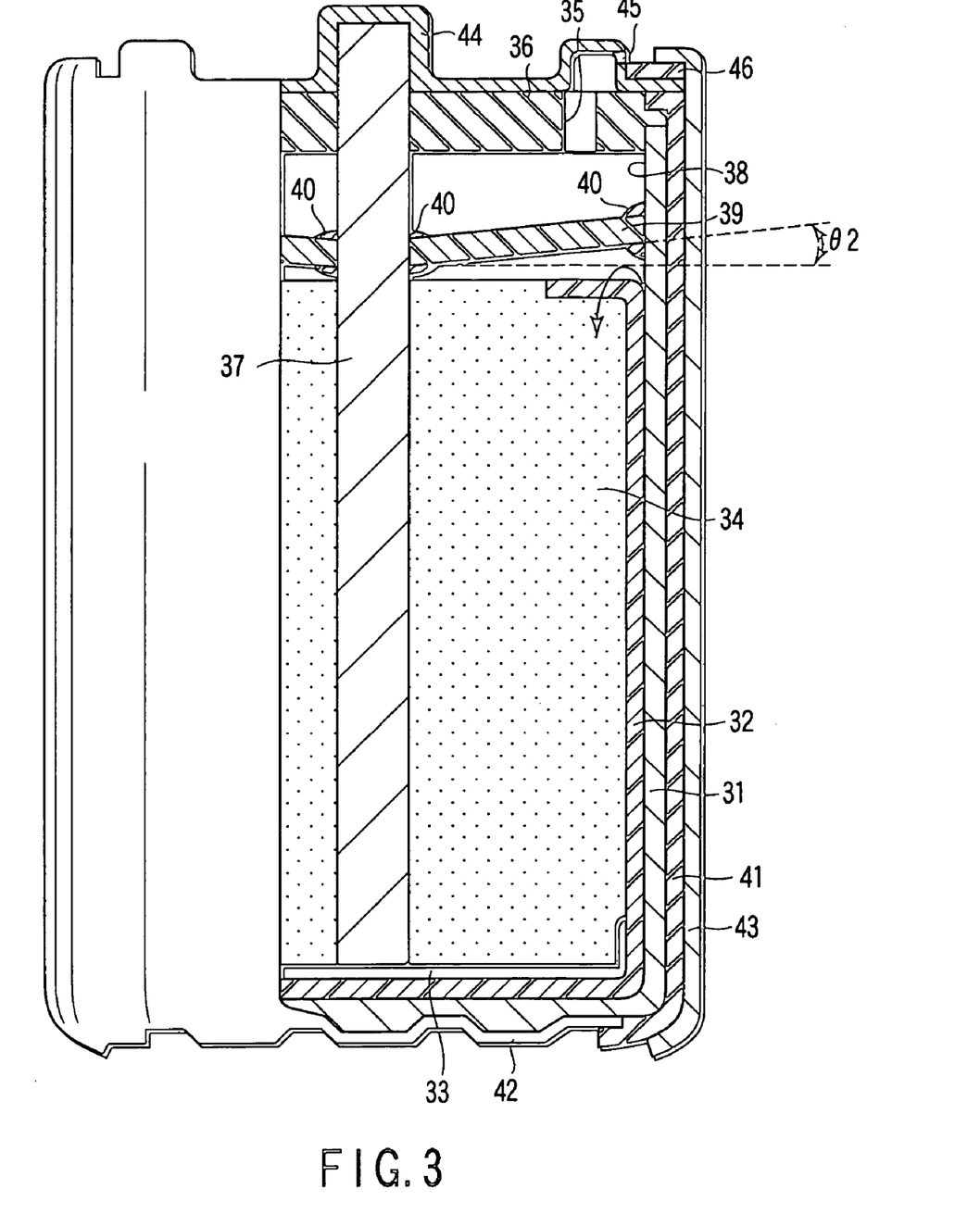
FIG. 3 is a sectional view showing an aluminum negative electrode battery of manganese dry battery structure as an example of a second battery of the invention.

An example of the second battery is explained by referring to FIG. 3.

As shown in FIG. 3, a negative electrode can 31 of cylindrical form with bottom made of aluminum or aluminum alloy is filled with a positive electrode mixture 34 containing a positive electrode active material, a conductive agent, and an aqueous electrolytic solution, by way of a separator 32 and a bottom paper 33.

An insulating washer 36 having a gas vent hole 35 is fitted into the opening upper end of the negative electrode can 31, and is plugging the opening of the negative electrode can 31. A positive electrode current collector 37 is inserted into an opening of the insulating washer 36, and the upper end is projecting from the insulating washer 36. A space formed between the positive electrode mixture 34 in the negative electrode can 31 and the insulating washer 36 functions as an air space 38. An annular hydrogen gas permeable sheet 39 is inserted into the positive electrode current collector 37 in the air space 38. The hydrogen gas permeable sheet 39 is inclined in a conical form so that the distance between the lower surface of the sheet 39 and the upper surface of a power generating element may decrease from the side wall of the negative electrode can 31 toward the positive electrode current collector 37. The distance between the positive electrode mixture 34 and the inner circumference of the hydrogen gas permeable sheet 39 is shorter than the distance between the mixture 34 and any other part of the sheet 39, and the distance between the power generating element and the outer circumference of the sheet 39 is longer than the power generating element and any other part of the sheet 39. The inclination angle $\theta_2$ of the hydrogen gas permeable sheet 39 to the upper surface of the power generating element is preferred to be in a range of 3 degrees to 65 degrees. A liquid gasket 40 is interposed between the outer circumference of the hydrogen gas permeable sheet 39 and the inner circumference of the negative electrode can 31, and between the outer circumference of the negative electrode current collector 37 and the inner circumference of the hydrogen gas permeable sheet 39, thereby joining the hydrogen gas permeable sheet 39, negative electrode current collector 37, and negative electrode can 31.

A heat shrink tube 41 covers the surrounding of the negative electrode can 31, fixes the insulating washer 36 to the opening of the negative electrode can 31, and fixes a negative electrode terminal plate 42 to the bottom of the negative electrode can 31. A cylindrical package 43 covers the heat shrink tube 41. A cap-shaped sealing plate (positive electrode terminal plate) 44 serving also as positive electrode terminal is arranged in the upper opening of the package 43 so as to cover the upper end of the positive electrode current collector 37, and a gas vent hole 45 is formed in the sealing plate 44. An insulating ring 46 is interposed between the package 43 and sealing plate 44.

According to the aluminum negative electrode battery having such structure, both discharge capacity and electrolyte leakage prevention can be enhanced.

That is, by arranging the hydrogen gas permeable sheet 39 in the air space 38, the power generating elements that includes the positive electrode mixture 34 and separator 32 are enclosed in the negative electrode can 31, and further by inclining the hydrogen gas permeable sheet 39 so that the distance between the sheet 39 and power generating elements may decrease from the side wall of the negative electrode can 31 toward the center, or along the radial direction, it is discovered that the electrolyte overflowing from the negative electrode and separator can be returned to the positive electrode as indicated by an arrow in FIG. 3 without any leak to outside of the battery. Besides, the hydrogen gas generated by discharge reaction passes through the hydrogen gas permeable sheet 39, and sequentially passes through the gas vent hole 35 of the insulating washer 36 and gas vent hole 45 of the sealing plate 44, and is released outside, and therefore the hydrogen gas can be released outside of the battery while the evaporation of electrolytic solution is minimized. Therefore, according to the invention, both enhancement of discharge capacity and suppression of electrolyte leakage can be achieved.

The positive electrode, negative electrode, separator, electrolytic solution, and hydrogen gas permeable sheet used in the second battery may be the same as those explained in the first battery.

The inclination angle $\theta_2$ is preferred to be in a range of 3 degrees to 65 degrees by the same reason as explained in the first battery. A more preferred range of inclination angle $\theta_2$ is 15 degrees to 45 degrees. In FIG. 3, the both surfaces of the hydrogen gas permeable sheet 39 are inclined, but only the surface facing the power generating element may be inclined.

The hydrogen gas permeable sheet 39 may be brought in contact with the power generating element.

In FIG. 3, the hydrogen gas permeable sheet 39 is arranged apart from the power generating element, and when a space is thus formed between the power generating element and hydrogen gas permeable sheet 39, the electrolytic solution can be returned smoothly from the interface of the negative electrode can 31 and separator 32 to the positive electrode, and the electrolyte leakage occurrence may be much lowered. This space also function as a space for temporarily holding the generated hydrogen gas, and elevation of internal pressure due to generation of hydrogen gas can be lessened.

By using the liquid gasket 40, the hydrogen gas permeable sheet 39 can be arranged between the inner circumference of the negative electrode can 31 and the positive electrode current collector 37 without any gap, and the electrolyte leakage preventive effect can be further enhanced. In the aluminum negative electrode battery having the structure as shown in FIG. 3, rupture of the battery due to gas generation by certain trouble or the like can be avoided as the liquid gasket 40 is torn so that the gas escapes outside of the battery, and thereby a safe state is assured.

The material for forming the liquid gasket may be the same material as explained in the first battery.

The junction limit pressure of the liquid gasket measured by the pressure resisting test of JIS K 6820 is preferred to be 80 kgf/cm$^2$ or less by the same reason as explained in the first battery. A more preferred range of the junction limit pressure is 30 kgf/cm$^2$ or less, and a most preferred range is 10 kgf/cm$^2$ or less.

An annular water repellent layer of contact angle with water of 70 degrees or more should be preferably formed on the inner surface of the side wall of the negative electrode case and positioned between the power generating element and hydrogen gas permeable sheet 39. As a result, the electrolyte leakage rate is further lowered. That is, along with the progress of discharge, discharge product such as aluminum hydroxide is contained in the electrolytic solution at high concentration, and the surface tension of the electrolytic solution is raised, and the electrolytic solution is likely to leak out through the wall of the negative electrode can 31. The water repellent layer suppresses creeping of the electrolytic solution over the separator 32, and electrolyte leakage outside of the battery can be reduced. Moreover, by forming the water repellent layer at a position closer to the upper end of the positive electrode mixture 34, it is effective to return the creeping electrolytic solution back to the positive electrode.

The water repellent layer is preferred to contain at least one resin selected from olefin resin, silicone resin, acrylic resin, epoxy resin, and fluoro plastic resin. The water repellent layer may be formed also of a component material of hydrogen gas permeable sheet.

In FIG. 3, the hydrogen gas permeable sheet 39 is inclined, but instead of inclining the hydrogen gas permeable sheet 39, the height of the positive electrode mixture 34 may be varied, and the top of the positive electrode mixture 34 may be inclined, and thereby the distance between the positive electrode mixture 34 and hydrogen gas permeable sheet 39 may be varied. However, by varying the height of the positive electrode mixture 34, the discharge reaction takes place locally and uneven reaction occurs, and hence it is preferred to incline the hydrogen gas permeable sheet 39.

In the first and second batteries of the invention, the hydrogen gas permeable sheet of a smooth surface is used, but instead of this hydrogen gas permeable sheet, a hydrogen gas permeable sheet with a roughened surface of 0.01X μm or more to 0.95X μm or less in depth may be used. If the surface is applied surface roughening, the hydrogen gas permeable sheet may be inclined in part or on the whole as in the hydrogen gas permeable sheet 13 or 39, or may be a flat plate without inclination.

A third battery of the invention comprises:

a battery case, a power generating element stored in the battery case and including an aqueous electrolytic solution, and a hydrogen gas permeable sheet provided in the opening of the battery case, the hydrogen gas permeable sheet having a water repellence of 2 kPa or more and a He gas permeability at 30° C. in a range of $2\times10^{-6}$ to $10000\times10^{-6}$ (cm$^3$ (STP) cm/sec·cm$^2$·cmHg), in which the hydrogen gas permeable sheet has a surface that faces the power generating element and has recesses satisfying the following formula (1).

$$0.01X \leq D \leq 0.95X \quad (1)$$

where D is a depth (μm) of each recess, and X is the thickness (μm) of the hydrogen gas permeable sheet.

Herein, the battery case is either the power generating element container or the negative electrode container.

In the third battery of the invention, it is desired that the hydrogen gas permeable sheet is fixed by a liquid gasket of which junction limit pressure is 80 kgf/cm$^2$ or less at the opening of the battery case.

Also in the third battery of the invention, it is desired that a water repellent layer of contact angle with water of 70 degrees or more is provided on the inner surface of the battery case and between the hydrogen gas permeable sheet and the power generating element.

Figure 4:
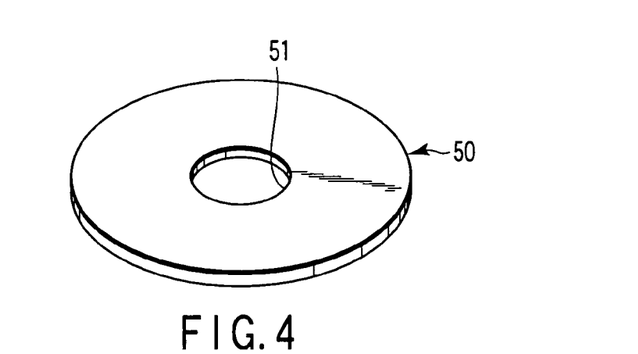
FIG. 4 is a perspective view showing a different example of hydrogen gas permeable sheet incorporated in the first and second batteries of the invention.
Figure 5:
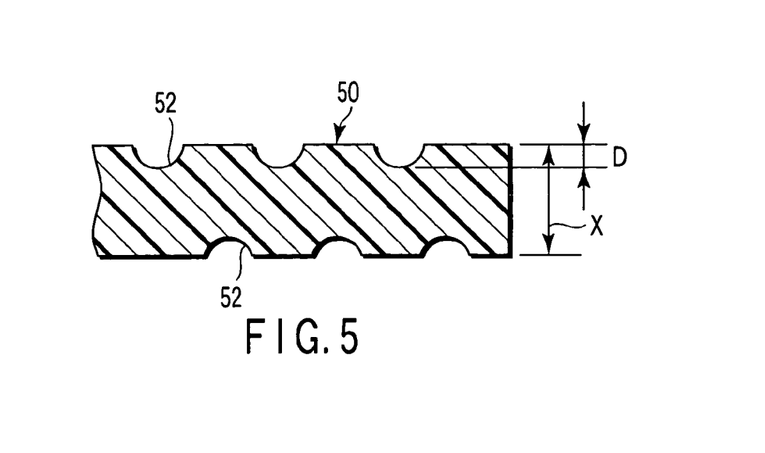
FIG. 5 is a partial enlarged sectional view of the hydrogen gas permeable sheet in FIG. 4.

An example of the third battery of the invention is explained by referring to FIG. 4 and FIG. 5.

This hydrogen gas permeable sheet 50 is a disk and has a circular hole 51 opened in the center for inserting the negative electrode gasket 4 or positive electrode current collector 37. Both surfaces of the hydrogen gas permeable sheet 50 have recesses 52 in depth D of 0.01X μm or more to 0.95X μm or less. By limiting the depth of the recesses 52 to this range, the surface area of the hydrogen gas permeable sheet 50 can be expanded, and the pressure applied per unit surface area can be decreased, and it is effective to suppress deformation of the hydrogen gas permeable sheet 50 due to sudden pressure increase by unexpected electrolyte leakage. Further, as the surface area is increased, the gas permeable amount increases, and gas can be released easily. However, if the depth D of the recesses 52 is less than 0.01X μm, it may be hard to improve the pressure resistance and gas diffusion speed of the hydrogen gas permeable sheet 50. If the depth D of the recesses 52 is more than 0.95X μm, the strength of the hydrogen gas permeable sheet 50 is lowered, and the hydrogen gas permeable sheet 50 may be deformed at the time of generation of gas. A more preferred range of depth of the recesses 52 is 0.05X μm to 0.6X μm.

Flange paper is not necessary when the hydrogen gas permeable sheet 39 is installed, but it may be provided. In such a case, if it is arranged between the positive electrode mixture 34 and hydrogen gas permeable sheet 39, the circulation of the electrolytic solution is disturbed. It is preferred to arrange the flange paper between the insulating washer 36 and the hydrogen gas permeable sheet 39. If the flange paper or washer is plurally provided, although the electrolyte leakage preventive effect is improved, the filling amount of the battery active material is decreased, and it is preferred to use one piece only. The washer and positive electrode terminal plate are desired to have gas vent holes for releasing the gas generated in the battery. The hole should be provided with a rubber valve or the like so as to be opened and closed repeatedly. Alternately, by arranging the hydrogen gas permeable sheet by overlaying at the inner surface do as to cover the hole of the washer or positive electrode terminal plate, the function as gas vent hole is realized. Alternately, instead of opening a hole, in particular, gas may be released outside of the battery through a gap between the washer and negative electrode can 31 or a gap between the washer 36 and positive electrode current collector 37 depending on the size of the gap. Alternately, as a safety valve in the case of abnormal discharge, a thinnest wall may be formed by cutting off part of the hydrogen gas permeable sheet 39, flange paper, washer, positive electrode terminal plate 44 or negative electrode can 31. The thickness t of the thinnest wall is preferred to be in a range of 5 to 300 μm.

Examples of the invention are described in detail below while referring to the accompanying drawings.

EXAMPLE 1

An aluminum negative electrode battery having an alkaline dry battery structure as shown in FIG. 1 and FIG. 2 was manufactured in the following method.

<Fabrication of Positive Electrode>

Electrolytic manganese dioxide (MnO$_2$) was used as positive electrode active material, and this positive electrode active material was mixed with 10 wt. % of acetylene black as conductive agent, and 3 wt. % of polytetrafluoroethylene as binder, and the mixture was molded by pressure into a cylindrical form, and a positive electrode mixture was obtained.

<Preparation of Electrolysic Solution>

A mixed aqueous solution was prepared, which contains 1 M/L of AlCl$_3$, 0.1 M/L of 2,2-bipyridyl, 0.5 M/L of KCl, and 0.2 M/L of Al(NO$_3$)$_3$.

<Fabrication of Negative Electrode>

By mixing 95 wt. % of aluminum powder with purity of 99.99% (4N) and 4 wt. % of acrylic acid polymer as thickener, electrolytic solution was added thereto and a negative electrode gel was prepared. As negative electrode current collector, a stainless steel bar was prepared.

<Gas Permeable Water Repellent Organic Polymer Sheet>

A sheet of ethylene fluoride propylene copolymer (Teflon FEP, registered trademark) having the He gas permeability coefficient at 30° C. (as measured by "the gas permeability testing method of plastic film and sheet" specified in JIS K 7126 (1987)) and water repellency (by using metering pump as described above) as shown in Table 1 was prepared. The thickness of the sheet was 0.5 mm. This sheet is shaped like a ring. It has an outside diameter of 13 mm. Its peripheral edge is inclined by 20° for 8 mm in the radial direction. The both surfaces of the sheet are free from recesses. This sheet can be used as a filter.

(Assembling of Battery)

In the positive electrode can 9 of cylindrical form with bottom serving also as positive electrode current collector, a cylindrical positive electrode mixture 10 and a bag-shaped separator 11 formed of a glass fiber sheet having a thickness of 30 μm were provided, and the separator 11 was filled with negative electrode gel 12, and electrolytic solution was poured into the positive electrode mixture 10, separator 11 and negative electrode gel 12. Then, a negative electrode current collector 6 was inserted into the negative electrode gel 12. In succession, a water repellent organic polymer sheet 13 was interposed between the inner circumference of the positive electrode can 9 and the thick wall 4a of the negative electrode gasket 4 so that the distance between the upper surface of the sheet 13 and the lower surface of the positive electrode mixture 10 may decrease from the center of the positive electrode can to the side wall. The outer circumference of the water repellent organic polymer sheet 13 was joined to the inner circumference of the positive electrode can 9 by means of silicone rubber liquid gasket 14b (junction limit pressure measured by pressure resisting test of JIS K 6820 of 10 kgf/cm$^2$), and the inner circumference of the sheet 13 was joined to the periphery of the thick wall 4a of the negative electrode gasket 4 by means of silicone rubber liquid gasket 14a (junction limit pressure measured by pressure resisting test of JIS K 6820 of 10 kgf/cm$^2$). The water repellent organic polymer sheet 13 was brought into contact with the lower side of the separator 11.

In succession, by sealing the bottom plate 2 serving also as negative electrode terminal, sealing plate 14 serving also as positive electrode terminal, and polypropylene package 1, a cylindrical aluminum negative electrode battery of 14 mm in diameter and 50 mm in overall height having a structure as shown in FIG. 1 and FIG. 2 was fabricated.

EXAMPLES 2 TO 7

Aluminum negative electrode batteries in the same structure as in example 1 were manufactured except that the material of the water repellent organic polymer sheet 13, He gas permeability coefficient at 30° C. of the sheet 13, water repellency of the sheet 13, and the negative electrode material were changed as shown in Table 1. In the table, the low density polyethylene has density of 0.91 to 0.93 g/cm$^3$, and high density polyethylene has density of 0.94 to 0.96 g/cm$^3$. As ethylene fluoride propylene copolymer, Teflon FEP (registered trademark) was used.

EXAMPLES 8 TO 14

Aluminum negative electrode batteries in the same structure as in example 1 were manufactured except that the inclination angle $\theta_1$ of the water repellent organic polymer sheet 13 to the positive electrode mixture 10 was changed as shown in Table 1.

EXAMPLES 15 TO 17

Aluminum negative electrode batteries in the same structure as in example 1 were manufactured except that the water repellent organic polymer sheet 13 same as in example 1 was roughened in the surface in the following method to form recesses of depth specified in Table 1 in both surfaces. Herein, X is equal to the thickness of the water repellent organic polymer sheet 13.

In roughening process, both heat and load were applied to the water repellent sheet at the same time by using a hot press having a desired surface roughness.

EXAMPLE 18

An ethylene fluoride propylene copolymer (Teflon FEP, registered trademark) sheet of 0.5 mm in thickness having the He gas permeability coefficient at 30° C., and water repellency as shown in Table 1 was prepared. This sheet is a ring of outside diameter of 14 mm without inclination. An aluminum negative electrode battery in the same structure as in example 1 was manufactured except that the both surfaces of this sheet were provided with recesses in the depth as shown in Table 1 in the same manner as explained in example 17.

COMPARATIVE EXAMPLE 1

An aluminum negative electrode battery in the same structure as in example 1 was manufactured except that a flat water repellent organic sheet without inclination was used.

COMPARATIVE EXAMPLES 2 AND 3

Aluminum negative electrode batteries in the same structure as in example 1 were manufactured except that the material of the water repellent organic polymer sheet 13, He gas permeability coefficient at 30° C. of the sheet 13, and water repellency of the sheet 13 were changed as shown in Table 1.

In the batteries obtained in examples 1 to 18 and comparative examples 1 to 3, the battery capacity was measured by discharging at a constant current of 100 mA until the voltage was lowered to 0.65 V, and results are shown in Table 2. 100 cells of each battery were prepared, the number of cells causing electrolyte leakage until discharged to 0.3 V was counted, and results are also shown in Table 2. For electrolyte leakage, the battery weight was measured before and after discharge, and the number of cells decreased in the battery weight by 0.1 g or more was counted.

TABLE 1

| | Water repellent organic polymer sheet | | | | | |
|---|---|---|---|---|---|---|
| | Gas permeability coefficient in He gas at 30° C. (cm$^3$ (STP) cm/ sec · cm$^2$ · cmHg) | Water repellency (kPa) | Material | Inclination angle $\theta_1$ (°) | Depth of recess (μm) | Negative electrode active material |
| Example 1 | $2 \times 10^{-4}$ | 5 | Teflon FEP | 20 | No recess | 4N—Al |
| Example 2 | $1 \times 10^{-4}$ | 3 | Polystyrene | 20 | No recess | 4N—Al |
| Example 3 | $3 \times 10^{-5}$ | 4 | Polycarbonate | 20 | No recess | 4N—Al |
| Example 4 | $7 \times 10^{-4}$ | 3 | Cellulose acetate | 20 | No recess | 4N—Al |
| Example 5 | $3 \times 10^{-5}$ | 3 | Ethyl cellulose | 20 | No recess | 4N—Al |

TABLE 1-continued

| | Water repellent organic polymer sheet | | | | | |
|---|---|---|---|---|---|---|
| | Gas permeability coefficient in He gas at 30° C. ($cm^3$ (STP) cm/ sec · $cm^2$ · cmHg) | Water repellency (kPa) | Material | Inclination angle $\theta_1$ (°) | Depth of recess (μm) | Negative electrode active material |
| Example 6 | $3 \times 10^{-6}$ | 2 | Low density polyethylene | 20 | No recess | 5% Zn—95% Al |
| Example 7 | $1 \times 10^{-3}$ | 2 | Nylon 6 | 20 | No recess | 4N—Al |
| Example 8 | $2 \times 10^{-6}$ | 9 | Teflon FEP | 5 | No recess | 4N—Al |
| Example 9 | $1 \times 10^{-5}$ | 12 | Teflon FEP | 10 | No recess | 4N—Al |
| Example 10 | $4 \times 10^{-4}$ | 4 | Teflon FEP | 30 | No recess | 4N—Al |
| Example 11 | $4 \times 10^{-4}$ | 4 | Teflon FEP | 40 | No recess | 4N—Al |
| Example 12 | $4 \times 10^{-4}$ | 4 | Teflon FEP | 45 | No recess | 4N—Al |
| Example 13 | $4 \times 10^{-4}$ | 4 | Teflon FEP | 65 | No recess | 4N—Al |
| Example 14 | $4 \times 10^{-4}$ | 4 | Teflon FEP | 70 | No recess | 4N—Al |
| Example 15 | $4 \times 10^{-4}$ | 4 | Teflon FEP | 20 | 0.01× | 4N—Al |
| Example 16 | $6 \times 10^{-4}$ | 3 | Teflon FEP | 20 | 0.5× | 4N—Al |
| Example 17 | $8 \times 10^{-4}$ | 2 | Teflon FEP | 20 | 0.95× | 4N—Al |
| Example 18 | $5 \times 10^{-4}$ | 3 | Teflon FEP | 0 | 0.4× | 4N—Al |
| Comparative Example 1 | $3 \times 10^{-4}$ | 4 | Teflon FEP | 0 | No recess | 4N—Al |
| Comparative Example 2 | $2 \times 10^{-4}$ | 0.1 | Vinylon | 0 | No recess | 4N—Al |
| Comparative Example 3 | $1 \times 10^{-10}$ | 13 | Polypropylene | 0 | No recess | 4N—Al |

TABLE 2

| | Capacity (mAh) | Electrolyte leakage (No. in 100 cells) |
|---|---|---|
| Example 1 | 1550 | 5 |
| Example 2 | 1600 | 6 |
| Example 3 | 1650 | 7 |
| Example 4 | 1550 | 6 |
| Example 5 | 1600 | 4 |
| Example 6 | 1550 | 3 |
| Example 7 | 1600 | 4 |
| Example 8 | 1200 | 12 |
| Example 9 | 1150 | 11 |
| Example 10 | 1550 | 6 |
| Example 11 | 1500 | 6 |
| Example 12 | 1600 | 4 |
| Example 13 | 1200 | 3 |
| Example 14 | 1150 | 4 |
| Example 15 | 1800 | 0 |
| Example 16 | 1900 | 0 |
| Example 17 | 1850 | 0 |
| Example 18 | 1300 | 5 |
| Comparative Example 1 | 800 | 40 |
| Comparative Example 2 | 700 | 90 |
| Comparative Example 3 | 500 | 70 |

As clear from Tables 1 and 2, in the batteries of examples 1 to 14 in which the hydrogen gas permeable sheet of which He gas permeability coefficient at 30° C. is in a range of $2 \times 10^{-6}$ to $10000 \times 10^{-6}$ ($cm^3$ (STP) cm/sec·$cm^2$·cmHg), and water repellency is 2 kPa or more is arranged so that the distance to the positive electrode mixture may decrease from the center of the positive electrode can toward the side wall, and the batteries of examples 15 to 18 in which both surfaces of the sheet have recesses the discharge capacity is larger and the number of cells with electrolyte leakage is smaller.

By contrast, in the battery of comparative example 1 in which the distance between the sheet and the positive electrode mixture is constant, and both surfaces of the sheet are free from recesses, and in the battery of comparative example 2 using the hydrogen gas permeable sheet of which water repellency is less than 2 kPa, the discharge capacity is smaller and the number of cells with electrolyte leakage is larger as compared with examples 1 to 18. On the other hand, in the battery of comparative example 3 using the hydrogen gas permeable sheet with the gas permeability coefficient of less than $2 \times 10^{-6}$ ($cm^3$ (STP) cm/sec·$cm^2$·cmHg), the discharge capacity is smaller as compared with examples 1 to 18.

EXAMPLE 19

An aluminum negative electrode battery having a manganese dry battery structure as shown in FIG. 3 was manufactured in the following method.

An electrolytic manganese dioxide as positive electrode active material, acetylene black as conductive agent, and an electrolytic solution formed of a mixed aqueous solution containing 1 M of $AlCl_3$, 0.1 M of 2,2-bipyridyl, 0.5 M of KCl, and 0.2 M of $Al(NO_3)_3$ was mixed at a ratio of 20:2:15 by weight, and a positive electrode mixture was prepared.

<Gas Permeable Water Repellent Organic Polymer Sheet>

Ethylene fluoride propylene copolymer (Teflon FEP, registered trademark) sheet of thickness of 0.5 mm, having the He gas permeability coefficient at 30° C. and water repellency as shown in Table 3 was prepared. This sheet is shaped like a ring. It has an outside diameter of 13 mm. Both sides of the sheet are inclined by 20°. The both surfaces of the sheet do not have recesses. This sheet can be used as a filter.

(Assembling of Battery)

A separator 32 and a bottom paper 33 were set in an aluminum negative electrode can 31 of cylindrical form with bottom with the thickness of 0.3 mm and purity of 99.99% (4N). The negative electrode can 31 was filled with 9.5 g of the positive electrode mixture 34. At a position far from the upper end of the positive electrode mixture 34 by 2 mm, a water repellent organic polymer sheet 39 was arranged so that the distance between the lower surface of the sheet 39 and the upper surface of the positive electrode mixture 34 may decrease from the side wall of the negative electrode can toward the center. In succession, the positive electrode current collector 37 was inserted into the opening of the water repellent organic polymer sheet 39, and the outer circumference of the water repellent organic polymer sheet 39 was joined to the inner circumference of the negative electrode can 31 by means of fluorine rubber liquid gasket 40 (junction limit pressure measured by pressure resisting test of JIS K 6820 of 20 kgf/cm$^2$), and the inner circumference of the sheet 39 was joined to the outer circumference of the positive electrode current collector 37 by means of fluorine rubber liquid gasket 40 (junction limit pressure measured by pressure resisting test of JIS K 6820 of 20 kgf/cm$^2$).

In succession, an insulating washer 36 was inserted into the positive electrode current collector 37 and fitted into the opening of the negative electrode can 31, and the peripheral edge of the insulating washer 36 and the outer circumference of the negative electrode can 31 were coated with a heat shrink tube 41. Further, an insulating ring 46 was arranged, and a positive electrode terminal plate 44 was put on the current collector 37, and thereby an aluminum negative electrode battery of 14 mm in diameter and 50 mm in overall height was fabricated.

EXAMPLES 20 TO 25

Aluminum negative electrode batteries in the same structure as in example 19 were manufactured except that the material of the water repellent organic polymer sheet 39, He gas permeability coefficient at 30° C. of the sheet 39, water repellency of the sheet 39, and the negative electrode material were changed as shown in Table 3. In the table, the low density polyethylene has density of 0.91 to 0.93 g/cm$^3$, and high density polyethylene has density of 0.94 to 0.96 g/cm$^3$. As ethylene fluoride propylene copolymer, Teflon FEP (registered trademark) was used.

EXAMPLES 26 TO 32

Aluminum negative electrode batteries in the same structure as in example 19 were manufactured except that the inclination angle $\theta_2$ of the water repellent organic polymer sheet 39 to the positive electrode mixture 34 was changed as shown in Table 3.

EXAMPLES 33 TO 35

Aluminum negative electrode batteries in the same structure as in example 19 were manufactured except that the water repellent organic polymer sheet 39 the same as in example 19 was roughened in the surface in the following method to form recesses of depth specified in Table 3 in both surfaces. Herein, X is equal to the thickness of the water repellent organic polymer sheet 39.

In roughening process, both heat and load were applied to the water repellent sheet at the same time by using a hot press having a desired surface roughness.

EXAMPLE 36

An ethylene fluoride propylene copolymer (Teflon FEP, registered trademark) sheet of 0.5 mm in thickness having the He gas permeability coefficient at 30° C., and water repellency as shown in Table 3 was prepared. This sheet is a ring of outside diameter of 14 mm without inclination. An aluminum negative electrode battery in the same structure as in example 19 was manufactured except that the both surfaces of this sheet were provided with recesses in the depth as shown in Table 3 in the same manner as explained in example 33.

EXAMPLE 37

An aluminum negative electrode battery in the same structure as in example 19 was manufactured except that an annular layer of Teflon FEP with contact angle with water of 110 degrees was arranged on the inner circumference of the negative electrode can 31 and positioned between the power generating element and the water repellent organic polymer sheet 39.

COMPARATIVE EXAMPLE 4

An aluminum negative electrode battery in the same structure as in example 19 was manufactured except that a flat water repellent organic sheet without inclination was used.

COMPARATIVE EXAMPLES 5 AND 6

Aluminum negative electrode batteries in the same structure as in example 19 were manufactured except that the material of the water repellent organic polymer sheet 39, He gas permeability coefficient at 30° C. of the sheet 39, and water repellency of the sheet 39 were changed as shown in Table 3.

In the batteries obtained in examples 19 to 37 and comparative examples 4 to 6, the battery capacity and electrolyte leakage (in 100 cells each) were measured in the same manner as in example 1, and results are shown in Table 4.

TABLE 3

| | Water repellent organic polymer sheet | | | | | Negative |
| | Gas permeability coefficient in He gas at 30° C. (cm$^3$ (STP) cm/ sec · cm$^2$ · cmHg) | Water repellency (kPa) | Material | Inclination angle $\theta_2$ (°) | Depth of recess (μm) | electrode active material |
|---|---|---|---|---|---|---|
| Example 19 | $2 \times 10^{-4}$ | 5 | Teflon FEP | 20 | No recess | 4N—Al |
| Example 20 | $1 \times 10^{-4}$ | 3 | Polystyrene | 20 | No recess | 4N—Al |
| Example 21 | $3 \times 10^{-5}$ | 4 | Polycarbonate | 20 | No recess | 4N—Al |
| Example 22 | $7 \times 10^{-4}$ | 3 | Cellulose acetate | 20 | No recess | 4N—Al |

TABLE 3-continued

| | Water repellent organic polymer sheet | | | | | |
|---|---|---|---|---|---|---|
| | Gas permeability coefficient in He gas at 30° C. (cm³ (STP) cm/ sec · cm² · cmHg) | Water repellency (kPa) | Material | Inclination angle θ₂ (°) | Depth of recess (μm) | Negative electrode active material |
| Example 23 | $3 \times 10^{-5}$ | 3 | Ethyl cellulose | 20 | No recess | 4N—Al |
| Example 24 | $3 \times 10^{-6}$ | 2 | Low density polyethylene | 20 | No recess | 5% Zn—95% Al |
| Example 25 | $1 \times 10^{-3}$ | 2 | Nylon 6 | 20 | No recess | 4N—Al |
| Example 26 | $2 \times 10^{-6}$ | 9 | Teflon FEP | 5 | No recess | 4N—Al |
| Example 27 | $1 \times 10^{-5}$ | 12 | Teflon FEP | 10 | No recess | 4N—Al |
| Example 28 | $4 \times 10^{-4}$ | 4 | Teflon FEP | 30 | No recess | 4N—Al |
| Example 29 | $4 \times 10^{-4}$ | 4 | Teflon FEP | 40 | No recess | 4N—Al |
| Example 30 | $4 \times 10^{-4}$ | 4 | Teflon FEP | 45 | No recess | 4N—Al |
| Example 31 | $4 \times 10^{-4}$ | 4 | Teflon FEP | 65 | No recess | 4N—Al |
| Example 32 | $4 \times 10^{-4}$ | 4 | Teflon FEP | 70 | No recess | 4N—Al |
| Example 33 | $4 \times 10^{-4}$ | 4 | Teflon FEP | 20 | 0.01× | 4N—Al |
| Example 34 | $6 \times 10^{-4}$ | 3 | Teflon FEP | 20 | 0.5× | 4N—Al |
| Example 35 | $8 \times 10^{-4}$ | 2 | Teflon FEP | 20 | 0.95× | 4N—Al |
| Example 36 | $5 \times 10^{-4}$ | 3 | Teflon FEP | 0 | 0.4× | 4N—Al |
| Example 37 | $2 \times 10^{-4}$ | 5 | Teflon FEP | 20 | No recess | 4N—Al |
| Comparative Example 4 | $3 \times 10^{-4}$ | 4 | Teflon FEP | 0 | No recess | 4N—Al |
| Comparative Example 5 | $2 \times 10^{-4}$ | 0.1 | Vinylon | 0 | No recess | 4N—Al |
| Comparative Example 6 | $1 \times 10^{-10}$ | 13 | Polypropylene | 0 | No recess | 4N—Al |

TABLE 4

| | Capacity (mAh) | Electrolyte leakage (No. in 100 cells) |
|---|---|---|
| Example 19 | 2700 | 3 |
| Example 20 | 2750 | 5 |
| Example 21 | 2650 | 4 |
| Example 22 | 2650 | 5 |
| Example 23 | 2600 | 5 |
| Example 24 | 2650 | 4 |
| Example 25 | 2700 | 4 |
| Example 26 | 2250 | 10 |
| Example 27 | 2250 | 9 |
| Example 28 | 2400 | 4 |
| Example 29 | 2450 | 5 |
| Example 30 | 2500 | 4 |
| Example 31 | 2250 | 4 |
| Example 32 | 2300 | 5 |
| Example 33 | 2900 | 0 |
| Example 34 | 3000 | 0 |
| Example 35 | 2950 | 0 |
| Example 36 | 2200 | 4 |
| Example 37 | 2900 | 0 |
| Comparative Example 4 | 1500 | 45 |
| Comparative Example 5 | 1200 | 50 |
| Comparative Example 6 | 1000 | 90 |

As clear from Tables 3 and 4, in the batteries of examples 19 to 32 and 37 in which the hydrogen gas permeable sheet of which He gas permeability coefficient at 30° C. is in a range of $2 \times 10^{-6}$ to $10000 \times 10^{-6}$ (cm³ (STP) cm/sec·cm²·cmHg), and water repellency is 2 kPa or more is arranged so that the distance to the power generating element may decrease from the side wall of the negative electrode can toward the center, and the batteries of examples 33 to 36 in which both surfaces of the sheet have recesses, the discharge capacity is larger and the number of cells with electrolyte leakage is smaller.

By contrast, in the battery of comparative example 4 in which the distance between the sheet and the positive electrode mixture is constant, and both surfaces of the sheet are free from recesses, and in the battery of comparative example 5 using the hydrogen gas permeable sheet of which water repellency is less than 2 kPa, the discharge capacity is smaller and the number of cells with electrolyte leakage is larger as compared with examples 19 to 37. On the other hand, in the battery of comparative example 6 using the hydrogen gas permeable sheet with the gas permeability coefficient of less than $2 \times 10^{-6}$ (cm³ (STP) cm/sec cm²·cmHg), the discharge capacity is smaller as compared with examples 19 to 37.

As described herein, the invention provides a battery enhanced in both discharge capacity and electrolyte leakage prevention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A battery comprising:
a power generating element container;
a positive electrode mixture opposing an inner surface of the power generating element container;
a negative electrode gel provided in the power generating element container and containing a negative electrode active material and an aqueous electrolytic solution;
a separator provided between the positive electrode mixture and the negative electrode gel; and a organic polymer sheet provided in an opening of the power generating element container, the organic polymer sheet having a water repellence of 2 kPa or more and a He gas permeability at 30° C. in a range of $2 \times 10^{-6}$ to $10000 \times 10^{-6}$ ($cm^3$ (STP) cm/sec·$cm^2$·cmHg), wherein a distance between the positive electrode mixture and the organic polymer sheet gradually decreases toward a side wall of the power generating element container.

2. The battery of claim 1, wherein the organic polymer sheet is fixed by a liquid gasket of which junction limit pressure is 80 kgf/$cm^2$ or less at the opening of the power generating element container.

3. the battery of claim 1, wherein a peripheral edge of the organic polymer sheet is folded toward the positive electrode mixture.

4. The battery of claim 1, wherein an air space is provided between the organic polymer sheet and the positive electrode mixture.

5. The battery of claim 1, wherein an inclination angle of the organic polymer sheet to a surface of the positive electrode mixture is in a range of 3 degree to 65 degrees.

6. The battery of claim 1, wherein a thickness of the organic polymer sheet is in a range of 0.1 mm to 3 mm.

7. The battery of claim 1, wherein recesses are formed in a surface facing the positive electrode mixture of the organic polymer sheet.

8. The battery of claim 7, wherein a depth of the recesses satisfies the following formula (1):

$$0.01X \leq D \leq 0.95X \quad (1)$$

where D is the depth of each recess (μm) and X is a thickness of the organic polymer sheet (μm).

9. A battery comprising:
a negative electrode container;
a positive electrode mixture provided in the negative electrode container, and holding an aqueous electrolytic solution;
a separator provided between an inner surface of the negative electrode container and the positive electrode mixture; and
a organic polymer sheet provided in an opening of the negative electrode container, the organic polymer sheet having a water repellence of 2 kPa or more and a He gas permeability at 30° C. in a range of $2 \times 10^{-6}$ to $10000 \times 10^{-6}$ ($cm^3$ (STP) cm/sec·$cm^2$·cmHg), wherein a distance between the positive electrode mixture and the organic polymer sheet gradually decreases away from a side wall of the negative electrode container.

10. The battery of claim 9, wherein the organic polymer sheet is fixed by a liquid gasket of which junction limit pressure is 80 kgf/$cm^2$ or less at the opening of the negative electrode container.

11. The battery of claim 9, wherein the organic polymer sheet is inclined in a conical form.

12. The battery of claim 9, wherein an air space is provided between the organic polymer sheet and the positive electrode mixture.

13. The battery of claim 9, wherein an inclination angle of the organic polymer sheet to a surface of the positive electrode mixture is in a range of 3 degree to 65 degrees.

14. The battery of claim 9, wherein a thickness of the organic polymer sheet is in a range of 0.1 mm to 3 mm.

15. The battery of claim 9, wherein recesses are formed in a surface facing the positive electrode mixture of the hydrogen gas permeable organic polymer sheet.

16. The battery of claim 15, wherein a depth of the recesses satisfies the following formula (1):

$$0.01X \leq D \leq 0.95X \quad (1)$$

where D is the depth of each recess (μm) and X is a thickness of the organic polymer sheet (μm).

17. A battery comprising:
a battery case;
a power generating element provided in the battery case and including an aqueous electrolytic solution; and
a organic polymer sheet provided in an opening of the battery case, the organic polymer sheet having a water repellence of 2 kPa or more and a He gas permeability at 30° C. in a range of $2 \times 10^{-6}$ to $10000 \times 10^{-6}$ ($cm^3$ (STP) cm/sec·$cm^2$·cmHg), wherein the organic polymer sheet has a surface that faces the power generating element and has recesses satisfying the following formula (1):

$$0.01X \leq D \leq 0.95X \quad (1)$$

where D is a depth of each recess (μm) and X is a thickness of the organic polymer sheet (μm).

18. The battery of claim 17, wherein the power generating element contains at least one of aluminum and aluminum alloy as a negative electrode active material, and the electrolytic solution contains at least one ion of sulfate ion and nitrate ion.

19. The battery of claim 1, wherein the organic polymer sheet is formed of a material selected from the group consisting of ethylene fluoride propylene copolymer, polystyrene, polycarbonate, cellulose acetate, ethyl cellulose, low density polyethylene and nylon 6.

* * * * *